United States Patent
Wei et al.

(10) Patent No.: US 8,876,351 B2
(45) Date of Patent: Nov. 4, 2014

(54) LIGHT EMITTING DIODE LAMP HAVING HEAT DISSIPATION MODULE

(75) Inventors: Chia-Hung Wei, Hsin-Chu (TW); Sheng-Hung Lin, Hsin-Chu (TW); Jung-Min Hwang, Hsin-Chu (TW)

(73) Assignee: Young Lighting Technology Inc., Hsin-Chu (TW)

(*) Notice: Subject to any disclaimer, the term of this patent is extended or adjusted under 35 U.S.C. 154(b) by 121 days.

(21) Appl. No.: 13/372,511

(22) Filed: Feb. 14, 2012

(65) Prior Publication Data
US 2012/0236593 A1 Sep. 20, 2012

(30) Foreign Application Priority Data
Mar. 14, 2011 (TW) .............................. 100108516 A

(51) Int. Cl.
| | | |
|---|---|---|
| *F21V 8/00* | (2006.01) | |
| *F21S 8/00* | (2006.01) | |
| *F21Y 101/02* | (2006.01) | |
| *F21Y 103/02* | (2006.01) | |

(52) U.S. Cl.
CPC ................ *F21S 8/03* (2013.01); *F21Y 2101/02* (2013.01); *F21V 2008/006* (2013.01); *F21Y 2103/022* (2013.01); *Y10S 362/80* (2013.01)
USPC ........... 362/609; 362/615; 362/626; 362/511; 362/800; 362/235

(58) Field of Classification Search
CPC .. G02B 6/0061; G02B 6/0011; G02B 6/0013; G02B 6/0015; G02B 6/0031; G02B 6/0036; G02B 6/0043
USPC .......................... 326/600, 608, 609, 626, 235
See application file for complete search history.

(56) References Cited

U.S. PATENT DOCUMENTS

| 4,105,293 A | 8/1978 | Aizenberg et al. |
|---|---|---|
| 6,435,687 B1 * | 8/2002 | Fukiharu ....................... 362/609 |

(Continued)

FOREIGN PATENT DOCUMENTS

| CN | 101737690 | 6/2010 |
|---|---|---|
| JP | 2004200128 A * | 7/2004 |

(Continued)

OTHER PUBLICATIONS

Machine english translation of JP2009199971 to Hatano et al.*

(Continued)

Primary Examiner — Sikha Roy
(74) Attorney, Agent, or Firm — Jianq Chyun IP Office

(57) ABSTRACT

A light emitting diode (LED) lamp includes a heat dissipation module, a circular light guide plate (LGP), and LED light sources. The heat dissipation module includes a heat dissipation element and a heat-conducting base that has a containing concave. The heat dissipation element connecting and surrounding the heat-conducting base is distant from the circumference of the heat-conducting base. The circular LGP in the containing concave has a top surface, a bottom surface, and an annular side surface. The top surface faces the heat-conducting base and has concentric annular trenches. The LED light sources are configured in the containing concave and face the annular side surface. The LED light sources are suitable for emitting a light beam which is capable of passing through the annular side surface to enter the circular LGP and capable of being reflected by the annular trenches and emitted from the bottom surface.

11 Claims, 5 Drawing Sheets

(56) References Cited

U.S. PATENT DOCUMENTS

| | | | |
|---|---|---|---|
| 6,631,998 B2* | 10/2003 | Egawa et al. | 362/612 |
| 7,025,482 B2* | 4/2006 | Yamashita et al. | 362/511 |
| 7,290,902 B2 | 11/2007 | Suehiro et al. | |
| 2009/0086480 A1* | 4/2009 | Chen | 362/235 |
| 2009/0168403 A1* | 7/2009 | Chang et al. | 362/97.1 |
| 2010/0124058 A1* | 5/2010 | Miller | 362/249.02 |
| 2011/0002116 A1* | 1/2011 | Chen et al. | 362/235 |
| 2011/0044038 A1* | 2/2011 | Mo | 362/235 |
| 2011/0221323 A1* | 9/2011 | Huang | 313/46 |
| 2011/0228561 A1* | 9/2011 | Lin et al. | 362/621 |
| 2011/0280019 A1* | 11/2011 | Zimmer et al. | 362/294 |

FOREIGN PATENT DOCUMENTS

| | | |
|---|---|---|
| JP | 2009-199971 | 9/2009 |
| TW | 200914764 | 4/2009 |
| TW | M387193 | 8/2010 |
| TW | 201107673 | 3/2011 |

OTHER PUBLICATIONS

Machine English translation of JP 2004200128 to Tsuda.*

"Office Action of Taiwan counterpart application" with English translation thereof, issued on Apr. 10, 2013, p. 1-p. 7.

* cited by examiner

LIGHT EMITTING DIODE LAMP HAVING HEAT DISSIPATION MODULE

CROSS-REFERENCE TO RELATED APPLICATION

This application claims the priority benefit of Taiwan application serial no. 100108516, filed on Mar. 14, 2011. The entirety of the above-mentioned patent application is hereby incorporated by reference herein and made a part of this specification.

BACKGROUND OF THE INVENTION

1. Field of the Invention

The invention relates to a lamp. More particularly, the invention relates to a light emitting diode (LED) lamp that has a heat dissipation module.

2. Description of Related Art

An LED is a semiconductor element, and a material of a light emitting chip of the LED mainly includes a compound selected from groups III-V chemical elements, such as gallium phosphide (GaP) or gallium arsenide (GaAs). The light emitting principle of the LED lies in the conversion of electric energy into light. Specifically, after a current is applied to the compound semiconductor, the LED releases an excess of energy in a form of light through the combination of electrons and electron holes. Since the luminance of the LED does not result from thermal emission or electric discharge, the life span of the LED could reach 100,000 hours or more. Moreover, the LED has the advantages of fast response speed, compact size, low power consumption, low pollution, high reliability, capability for mass production, etc. Therefore, the application of LED is fairly extensive. For instance, the LED could be applied to a mega-size outdoor display board, a traffic light, a mobile phone, a light source of a scanner and facsimile machine, an LED lamp, and so forth.

In general, the LED lamp requires optical elements (e.g., a prism) for achieving light-condensing effects. However, excessive elements lead to the difficulty in assembly and the increase in manufacturing costs, and the thickness of the lamp could not be effectively reduced. From another perspective, in order to prevent the LED from being overheated when the LED emits light, a heat dissipation structure could be configured in the LED lamp for heat dissipation. The larger the heat dissipation area of the heat dissipation structure, the greater the heat dissipation performance. Hence, how to expand the heat dissipation area of the heat dissipation structure becomes an important topic in this industry.

U.S. Pat. Nos. 7,290,902 and 7,025,482 both disclose a direct-type illumination device in which a circular light guide plate (LGP) has concentric annular trenches. U.S. Pat. No. 4,105,293 discloses an LED light source that surrounds a circular LGP. Taiwan Patent No. TW 1329182 discloses a lamp in which an LED surrounds a seat, a bowl-shaped LGP covers the seat, and heat dissipation fins surround an outer surface of a lampshade.

SUMMARY OF THE INVENTION

The invention is directed to an LED lamp that has favorable heat dissipation efficiency, light emission uniformity, and the simple structure.

Other features and advantages of the invention could be further understood by the technical features broadly embodied and described as follows.

In an embodiment of the invention, an LED lamp that includes a heat dissipation module, a circular LGP, and a plurality of LED light sources is provided. The heat dissipation module includes a heat-conducting base and a heat dissipation element. The heat-conducting base has a containing concave. The heat dissipation element has a connection portion through which the heat dissipation element is connected to the heat-conducting base. Besides, the heat dissipation element surrounds the circumference of the heat-conducting base. The heat dissipation element is distant from the circumference of the heat-conducting base. The circular LGP is configured in the containing concave. In addition, the circular LGP has a top surface, a bottom surface, and an annular side surface that connects the top surface and the bottom surface. The top surface faces the heat-conducting base and has a plurality of concentric annular trenches. The LED light sources are configured in the containing concave and face the annular side surface of the circular LGP. Here, the LED light sources are capable of emitting a light beam which is capable of passing through the annular side surface to enter the circular LGP and capable of being reflected by the annular trenches and emitted from the bottom surface.

Based on the above, according to the previous embodiments of the invention, the heat dissipation element is connected to the heat-conducting base through the connection portion, and the heat dissipation element is distant from the heat-conducting base. Thereby, the heat dissipation area could be expanded, and the distance between the heat dissipation element and the heat-conducting base is conducive to the improvement of air convection and heat dissipation efficiency. Moreover, after the light beam emitted by the LED light sources enters the circular LGP, the light beam could be reflected by the annular trenches of the circular LGP and emitted from the bottom surface of the circular LGP, such that the light patterns are circularly symmetric, and that light emission uniformity could be achieved. It is not necessary to add optical elements (e.g., the prism) to the LED lamp for condensing light. As a result, the LED lamp could have simpler structure, which leads to simplification of the manufacturing process and reduction of the manufacturing costs.

Other features and advantages of the invention will be further understood from the further technological features disclosed by the embodiments of the invention wherein there are shown and described embodiments of this invention, simply by way of illustration of best modes to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF EMBODIMENTS

In the following detailed description of the embodiments, reference is made to the accompanying drawings which form a part hereof, and in which are shown by way of illustration specific embodiments in which the invention may be practiced. In this regard, directional terminology, such as "top," "bottom," "front," "back," "left," "right," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. In addition, it is to be understood that the phraseology and terminology used herein are for the purposes of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Additionally, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
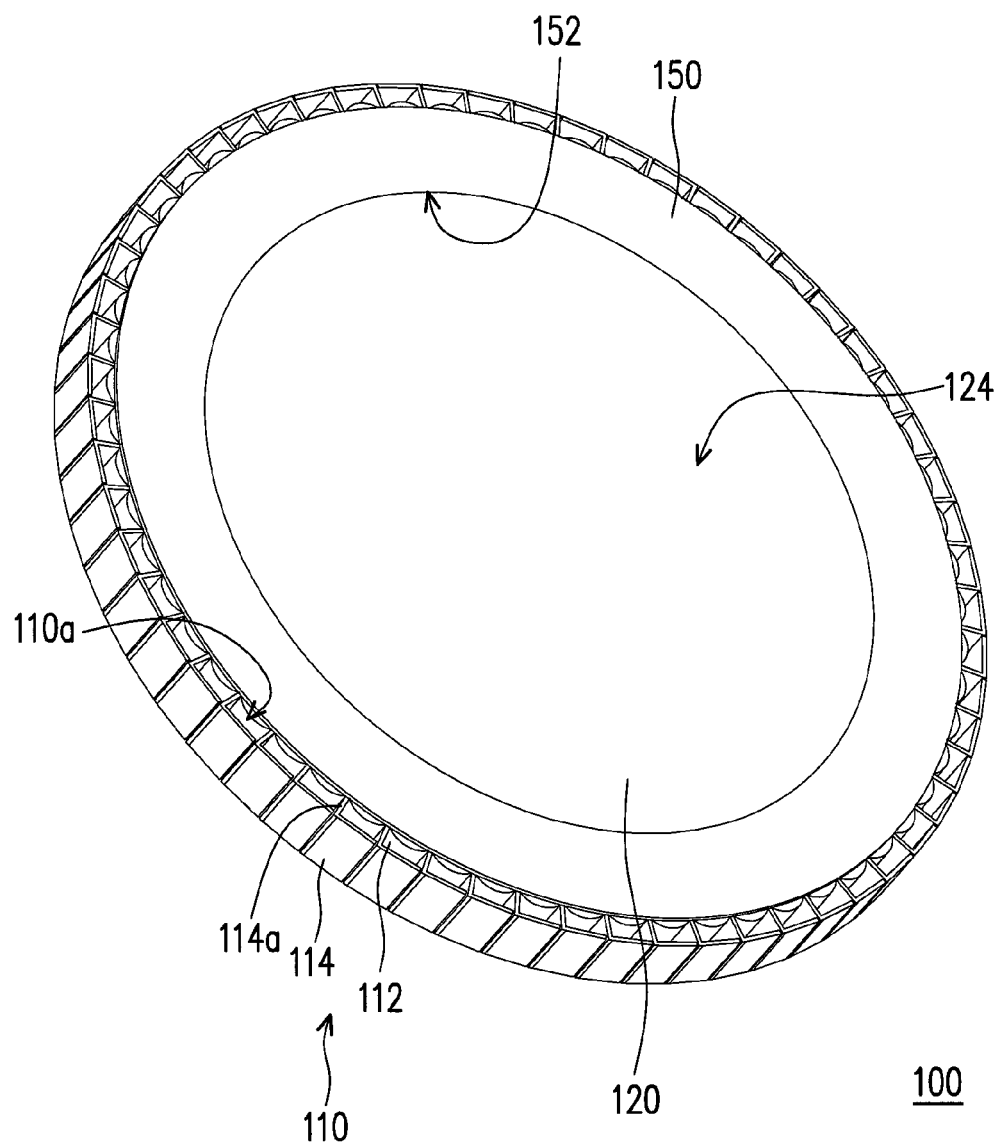
FIG. 1 is a three-dimensional view illustrating an LED lamp according to an embodiment of the invention.
Figure 2:
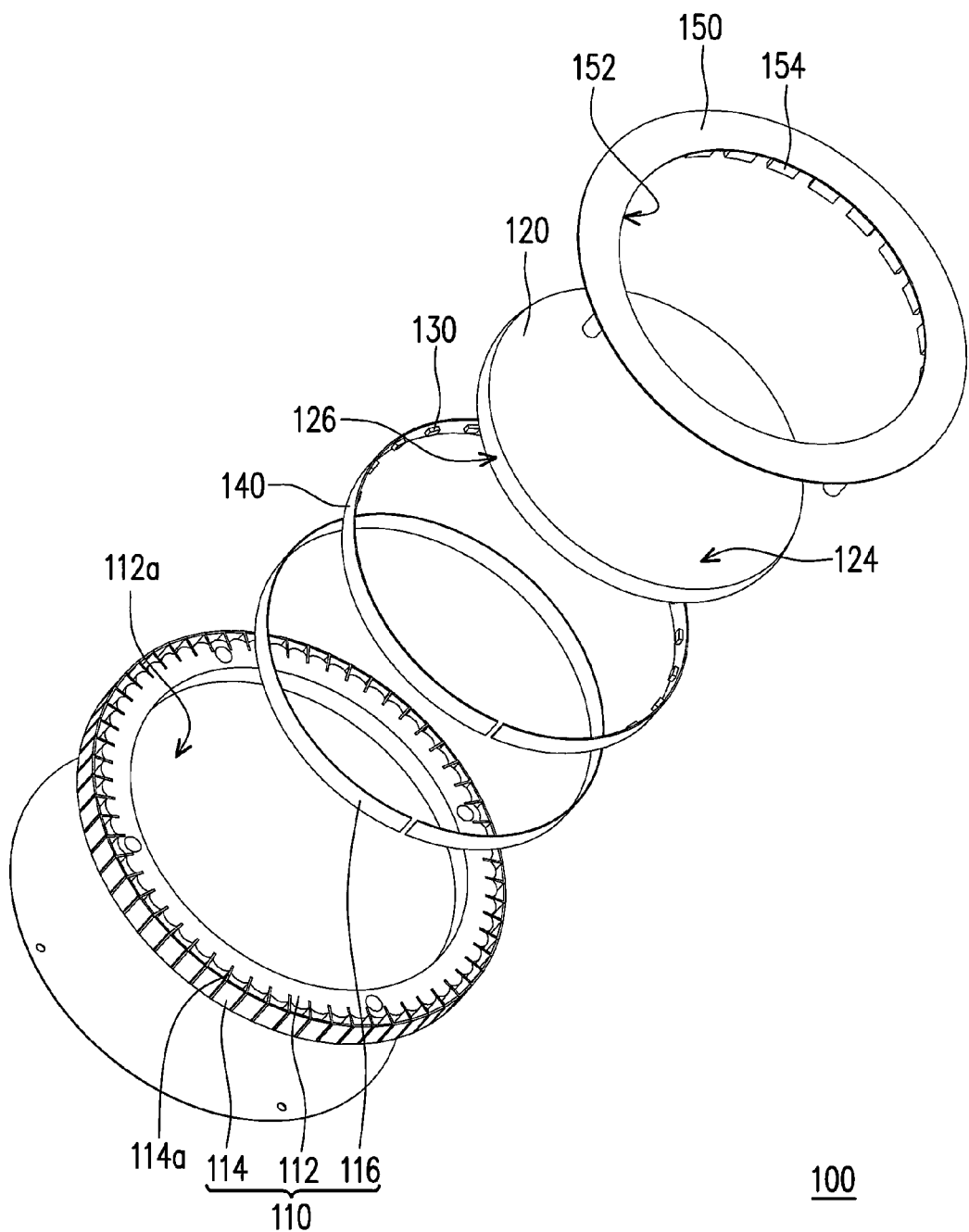
FIG. 2 is an explosive view illustrating the LED lamp depicted in FIG. 1.
Figure 3:
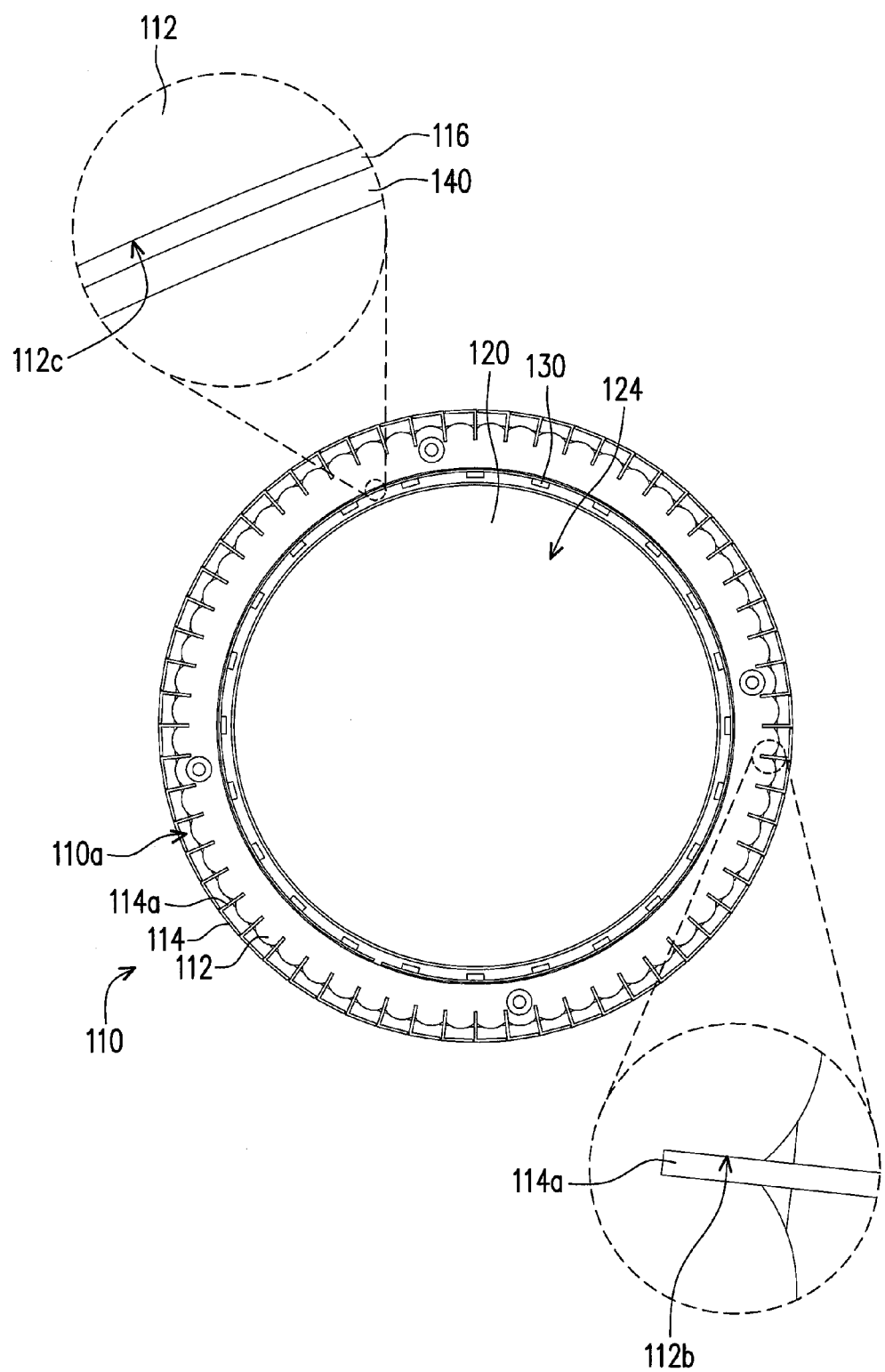
FIG. 3 is a three-dimensional view illustrating some elements in the LED lamp depicted in FIG. 1.

FIG. 1 is a three-dimensional view illustrating an LED lamp according to an embodiment of the invention. FIG. 2 is an explosive view illustrating the LED lamp depicted in FIG. 1. FIG. 3 is a three-dimensional view illustrating some elements in the LED lamp depicted in FIG. 1. With reference to FIG. 1 to FIG. 3, the LED lamp 100 of this embodiment is an indoor illumination lamp capable of being installed on the ceiling. The LED lamp 100 includes a heat dissipation module 110, a circular LGP 120, and a plurality of LED light sources 130. The heat dissipation module 110 includes a heat-conducting base 112 and a heat dissipation element 114. The heat-conducting base 112 has a containing concave 112a. The heat dissipation element 114 has a connection portion 114a through which the heat dissipation element 114 is connected to the heat-conducting base 112. In the drawings, plural connection portions 114a are shown. Besides, the heat dissipation element 114 surrounds the circumference of the heat-conducting base 112 and is distant from the circumference of the heat-conducting base 112 (shown as the distance 110a). The circular LGP 120 is configured in the containing concave 112a.

Figure 4:
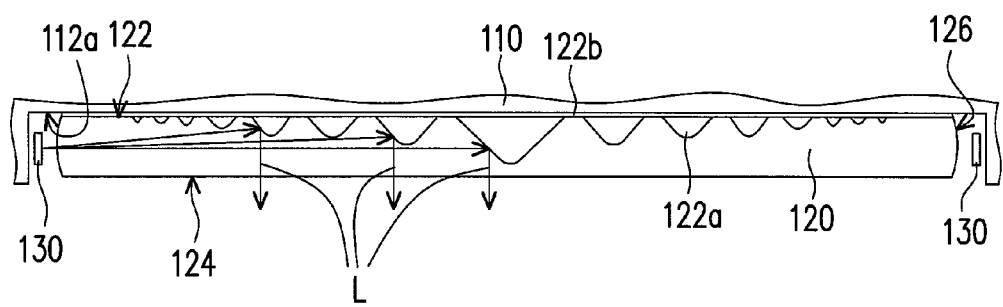
FIG. 4 is a schematic view illustrating some elements in the LED lamp depicted in FIG. 1.

FIG. 4 is a schematic view illustrating some elements in the LED lamp depicted in FIG. 1. With reference to FIG. 2 and FIG. 4, the circular LGP 120 of this embodiment has a top surface 122, a bottom surface 124, and an annular side surface 126 that connects the top surface 122 and the bottom surface 124. The top surface 122 faces the heat-conducting base 110 and has a plurality of concentric annular trenches 122a. The LED light sources 130 are configured in the containing concave 112a and face the annular side surface 126 of the circular LGP 120. Here, a light beam L emitted by the LED light sources 130 passes through the annular side surface 126 to enter the circular LGP 120, then is reflected by the annular trenches 122a, and is emitted from the bottom surface 124. To be more specific, as indicated in FIG. 4, the depth of each of the annular trenches 122a could decrease from the center of the circular LGP 120 to the annular side surface 126, such that the light beam L emitted by the LED light sources 130 could be substantially reflected to the bottom surface 124.

Under said arrangement, the heat dissipation element 114 is connected to the heat-conducting base 112 through the connection portions 114a, and the distance 110a exists between the heat dissipation element 114 and the heat-conducting base 112. Thereby, the heat dissipation area could be expanded, and the distance 110a is conducive to the improvement of air convection and the increase in the heat dissipation efficiency. Moreover, after the light beam L emitted by the LED light sources 130 enters the circular LGP 120, the light beam L could be reflected by the annular trenches 122a of the circular LGP 120 and emitted from the bottom surface 124, such that the light patterns are circularly symmetric, and that light emission uniformity could be achieved. It is not necessary to add optical elements (e.g., the prism) to the LED lamp 100 for condensing light. As a result, the LED lamp 100 could have a simpler structure, which leads to simplification of the manufacturing process and reduction of the manufacturing costs.

With reference to FIG. 2 and FIG. 3, the LED lamp 100 of this embodiment could further include a flexible circuit board 140 and a heat-conducting film 116. The flexible circuit board 140 could be bent in an annular manner and could be adhered to the heat-conducting film 116. The heat-conducting film 116 could also be adhered to an inner wall 112c of the containing concave 112a. Thereby, the heat generated by the light emitted by the LED light sources 130 could be transmitted to the heat dissipation element 114 sequentially through the flexible circuit board 140, the heat-conducting film 116, and the heat-conducting base 112. In another embodiment which is not shown in the drawings, the flexible circuit board 140 could be directly adhered to the inner wall 112c of the containing concave 112a, such that the heat-conducting film 116 is no longer required in the LED lamp 100.

With reference to FIG. 3, in this embodiment, the circumference of the heat-conducting base 112 has a plurality of concaves 112b, and the connection portions 114a of the heat dissipation element 114 are respectively inserted into the concaves 112b, so as to fix the heat dissipation element 114 to the heat-conducting base 112. The length of each of the connection portions 114a is designed to be greater than the depth of each of the concaves 112b according to this embodiment. Hence, after the connection portions 114a are inserted into the concaves 112b, the distance 110a could exist between the heat dissipation element 114 and the heat-conducting base 112. In this embodiment, a material of the heat dissipation element 114 could be copper, aluminum, or a zinc-plated steel plate, and the heat dissipation element 114 and its connection portions 114a could have small thickness if a punching process is performed, for instance. As such, more connection portions 114a could be formed in the limited space, and the heat dissipation area could be expanded.

As indicated in FIG. 1 and FIG. 2, the LED lamp 100 of this embodiment further includes a cover 150 that is configured on the heat-conducting base 110 and covers the LED light sources 130. The cover 150 has an opening 152. The opening 152 exposes the bottom surface 124 of the circular LGP 120, such that the light beam L depicted in FIG. 4 is capable of reaching the external surroundings via the opening 152 from the bottom surface 124.

Figure 5:
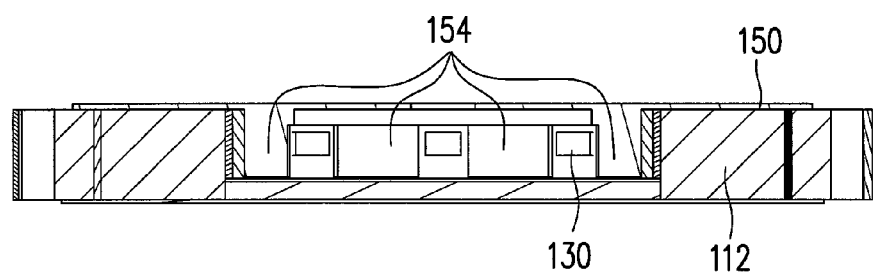
FIG. 5 is a schematic cross-sectional view illustrating the LED lamp depicted in FIG. 1.

FIG. 5 is a schematic cross-sectional view illustrating the LED lamp depicted in FIG. 1. With reference to FIG. 2 and FIG. 5, in this embodiment, one surface of the cover 150 facing the heat-conducting base 112 has a plurality of reflective bumps 154, each of the reflective bumps 154 is extended between the inner wall 112c of the containing concave 112a and the annular side surface 126 of the circular LGP 120, and the reflective bumps 154 and the LED light sources 130 are alternately interlaced. The light emission efficiency of the LED lamp 100 could be improved by the reflective bumps 154 that reflect the light emitted by the LED light sources 130. In addition, as shown in FIG. 4, a reflective layer 122b could be configured on the top surface 122 of the circular LGP 120 according to this embodiment, so as to further improve the light emission efficiency of the LED lamp 100.

Figure 6:
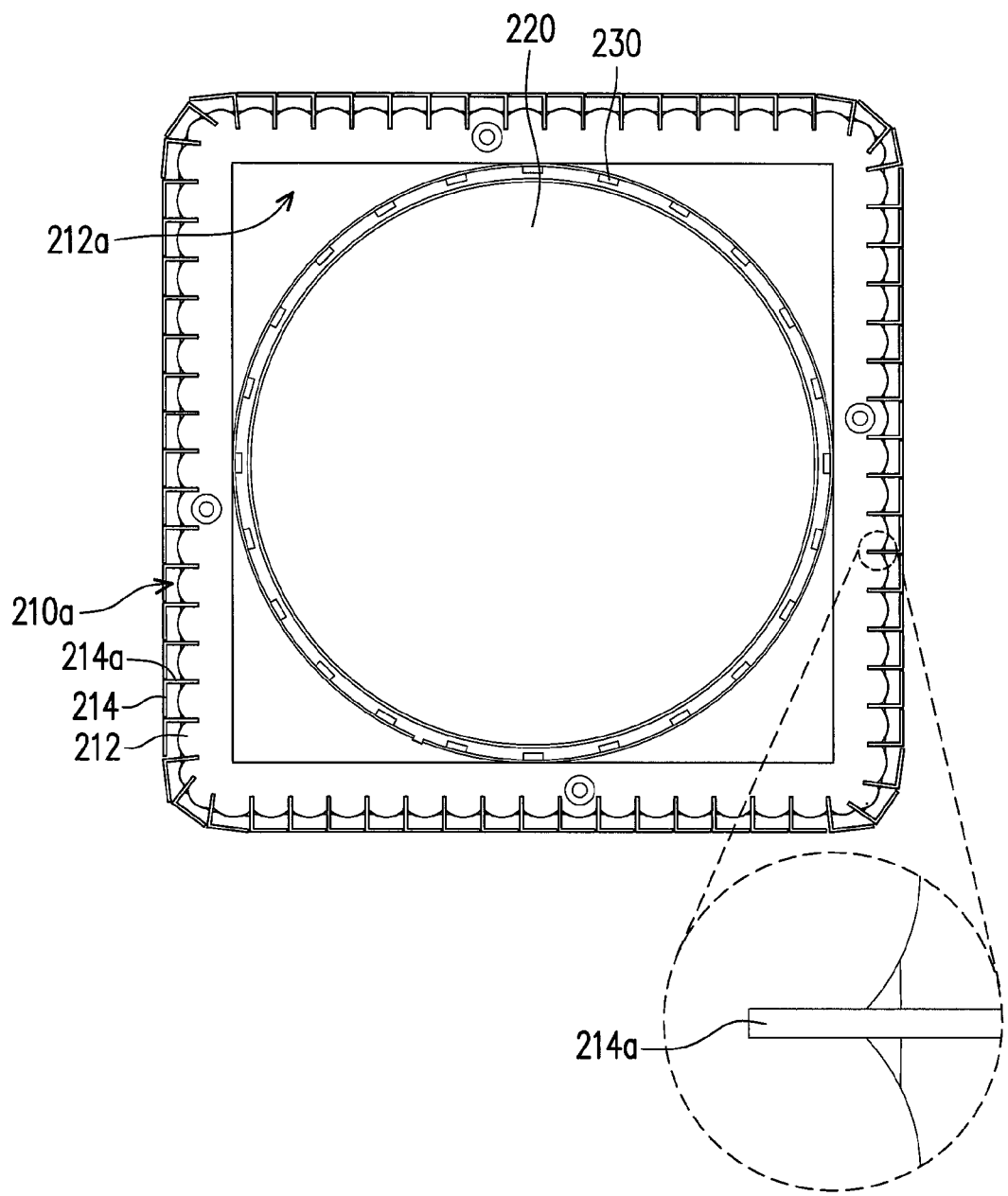
FIG. 6 is a three-dimensional view illustrating some elements in an LED lamp according to an embodiment of the invention.

As indicated in FIG. 1 to FIG. 3, the heat-conducting base 112 and the heat dissipation element 114 of the LED lamp 100 are circular. However, the shape of the heat-conducting base and the shape of the heat dissipation element are not limited in the invention, which will be exemplified below with reference to the drawings. FIG. 6 is a three-dimensional view illustrating some elements in an LED lamp according to an embodiment of the invention. With reference to FIG. 6, the heat-conducting base 212 and the heat dissipation element 214 of this embodiment are square. The heat dissipation element 214 has a connection portion 214a through which the heat dissipation element 214 is connected to the heat-conducting base 212. In the drawings, plural connection portions 214a are shown. Besides, the heat dissipation element 214 surrounds the circumference of the heat-conducting base 212 and is distant from the circumference of the heat-conducting base 212 (shown as the distance 210a). Thereby, the heat dissipation area could be expanded, and the distance 210a between the heat dissipation element 214 and the heat-conducting base 212 is conducive to the improvement of air convection and the increase in the heat dissipation efficiency. The circular LGP 220 is configured in the square containing concave 212a of the heat-conducting base 212. The LED light sources 230 are configured in the square containing concave 212a and face the side surface of the circular LGP 220, such that the light emitted by the LED light sources 230 passes through the circular LGP 220 and is emitted in a uniform manner.

In light of the foregoing, according to the embodiments of the invention, the heat dissipation element is connected to the heat-conducting base through the connection portion, and the heat dissipation element is distant from the heat-conducting base. Thereby, the heat dissipation area could be expanded, and the distance between the heat dissipation element and the heat-conducting base is conducive to the improvement of air convection and heat dissipation efficiency. Moreover, after the light beam emitted by the LED light sources enters the circular LGP, the light beam could be reflected by the annular trenches of the circular LGP and emitted from the bottom surface of the circular LGP, such that the light patterns are circularly symmetric, and that light emission uniformity can be achieved. It is not necessary to add optical elements (e.g., the prism) to the LED lamp for condensing light. As a result, the LED lamp could have a simpler structure, which leads to simplification of the manufacturing process and reduction of the manufacturing costs.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Apparently, many modifications and variations will be apparent to practitioners skilled in this art. The embodiments are chosen and described in order to best explain the principles of the invention and its best mode practical application, thereby to enable people skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention," "the present invention," or the like does not necessarily limit the claim scope to a specific embodiment, and the reference to particularly exemplary embodiments of the invention does not imply a limitation on the invention, and no such limitation is to be inferred. The invention is limited only by the spirits and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the disclosure is intended to be dedicated to the public regardless of whether the element or component is explicitly recited in the following claims.

What is claimed is:

1. A light emitting diode lamp comprising:
   a heat dissipation module comprising:
   a heat-conducting base having a containing concave; and
   a heat dissipation element having a connection portion and a surround portion, the surround portion connecting the heat-conducting base via the connection portion, the heat dissipation element surrounding a circumference of the heat-conducting base, and a distance being between the surround portion and the heat-conducting base;
   a circular light guide plate configured in the containing concave and having a top surface, a bottom surface, and an annular side surface connecting the top surface and the bottom surface, the top surface facing the heat-conducting base and having a plurality of concentric annular trenches, wherein a trench shape of each of the concentric annular trenches on a cross section surface passing through the center of the circular light guide plate and perpendicular to the top surface is symmetrical; and
   a plurality of light emitting diode light sources configured in the containing concave and facing the annular side surface of the circular light guide plate, the light emitting diode light sources being capable of emitting a light beam, the light beam being capable of passing through the annular side surface to enter the circular light guide plate and capable of being reflected by the annular trenches and emitted from the bottom surface.

2. The light emitting diode lamp as recited in claim 1, further comprising:
    a flexible circuit board configured in the containing concave and surrounding the circular light guide plate, the light emitting diode light sources being configured on the flexible circuit board.

3. The light emitting diode lamp as recited in claim 2, the heat dissipation module further comprising:
    a heat-conducting film configured between an inner wall of the containing concave and the flexible circuit board.

4. The light emitting diode lamp as recited in claim 1, further comprising:
    a cover configured on the heat-conducting base and covering the light emitting diode light sources, the cover having an opening, the opening exposing the bottom surface of the circular light guide plate.

5. The light emitting diode lamp as recited in claim 4, one surface of the cover facing the heat-conducting base having a plurality of reflective bumps, each of the reflective bumps being extended between an inner wall of the containing concave and the annular side surface.

6. The light emitting diode lamp as recited in claim 5, further comprising:
    a flexible circuit board configured in the containing concave and surrounding the circular light guide plate, the light emitting diode light sources being configured on the flexible circuit board, the reflective bumps and the light emitting diode light sources being alternately interlaced.

7. The light emitting diode lamp as recited in claim 1, wherein a depth of the annular trenches decreases from a center of the circular light guide plate to the annular side surface.

8. The light emitting diode lamp as recited in claim 1, wherein the top surface of the circular light guide plate has a reflective layer.

9. The light emitting diode lamp as recited in claim 1, wherein the circumference of the heat-conducting base has a plurality of concaves, the number of the connection portion is plural, and the connection portions are respectively inserted into the concaves.

10. The light emitting diode lamp as recited in claim 9, wherein a length of each of the connection portions is greater than a depth of each of the concaves.

11. The light emitting diode lamp as recited in claim 1, wherein the heat dissipation element is formed by punching.

* * * * *